US008396813B2

(12) United States Patent
Gaucas et al.

(10) Patent No.: US 8,396,813 B2
(45) Date of Patent: Mar. 12, 2013

(54) KNOWLEDGE-BASED METHOD FOR USING SOCIAL NETWORKING SITE CONTENT IN VARIABLE DATA APPLICATIONS

(75) Inventors: Dale Ellen Gaucas, Penfield, NY (US); Michael D. Shepherd, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 325 days.

(21) Appl. No.: 12/564,164

(22) Filed: Sep. 22, 2009

(65) Prior Publication Data

US 2011/0072035 A1    Mar. 24, 2011

(51) Int. Cl.
   *G06Q 99/00* (2006.01)
(52) U.S. Cl. .................................................. 705/319
(58) Field of Classification Search .................. None
   See application file for complete search history.

(56) References Cited

U.S. PATENT DOCUMENTS

| 6,032,004 A | 2/2000 | Mirabella, Jr. et al. |
| 7,142,326 B2 | 11/2006 | Bondy et al. |
| 2001/0036127 A1 | 11/2001 | McCravy |
| 2008/0162271 A1 | 7/2008 | Benjamin |
| 2008/0215985 A1 | 9/2008 | Batchelder et al. |
| 2009/0100329 A1 | 4/2009 | Espinoza |
| 2009/0125410 A1 | 5/2009 | Perlman |
| 2009/0132371 A1 | 5/2009 | Strietzel et al. |
| 2009/0135176 A1 | 5/2009 | Snoddy et al. |
| 2009/0138335 A1 | 5/2009 | Lieberman |
| 2009/0157630 A1 | 6/2009 | Yuan |

FOREIGN PATENT DOCUMENTS

| WO | 2005043312 A2 | 5/2005 |
| WO | 2010049826 A1 | 6/2010 |

OTHER PUBLICATIONS

EP Search Report Dated Jan. 5, 2011, Application No. 10178122.7-1527, Xerox Corporation, pp. 1-7.

*Primary Examiner* — Jonathan Ouellette
(74) *Attorney, Agent, or Firm* — Gibb & Riley, LLC (57) ABSTRACT

A method and system automatically obtain user page data from at least one social networking site, using at least one computerized device and automatically monitor the social networking site using the computerized device to detect an event. Upon the detection of an event, the method and system automatically identify a variable information document from a repository based on the topical content of the event using the computerized device. The method and system automatically select data from the user page data that matches the topical content of the event using the computerized device; automatically generate a variable data print instance by combining the images and text from the user page with the variable information document using the computerized device; and automatically output the variable data print instance to a user of the social networking site using the computerized device.

20 Claims, 8 Drawing Sheets

KNOWLEDGE-BASED METHOD FOR USING SOCIAL NETWORKING SITE CONTENT IN VARIABLE DATA APPLICATIONS

BACKGROUND AND SUMMARY

Embodiments herein generally relate to variable data printing applications and more particularly to a system and method that automates the use of variable data printing applications within social networking sites.

Social networking sites such as Facebook (www.facebook.com; Facebook, Palo Alto Calif., USA) incorporate content such as personal information, contacts, photos, albums, maps, and discussions as well as application add-ons that may result in additional content being displayed on a user's social networking site pages. This content is shared with a network of friends who in turn have their own social networking site content. Such content is often suitable for variable data products such as personalized calendars, greeting cards, photo albums, travel memory books, promotional materials and dimensional print items, as well as cross-media content. Currently there is no versatile method for obtaining customized and personalized print and cross-media products based on a user's social networking site and social network.

The embodiments herein provide a method for adding a knowledge-based, variable data print (VDP) application to a social networking site where the application can access and analyze the user's personal content and social network content to determine suitable VDP templates based on the available data and graphics. The application can offer previews of template instances that incorporate a particular user's content, as well as content from other users in said user's network, as well as delivery of purchased print and cross-media products based on those templates.

The application employs a hosted VDP service, for example based on XMPie, (www.xmpie.com; Xerox Corp., Norwalk Conn., USA) which contains a library of campaigns. These campaigns can use the content extracted from a social networking site as graphic assets and data sources for VDP template instances. The application also employs a knowledge-based system to reason about which templates are suitable for a user's social networking content and profiles.

Although Facebook and XMPie are used as examples in this description, as would be understood by those ordinarily skilled in the art, the concepts herein are applicable to other social networking sites and VDP platforms. The embodiments herein provide the integration of social networking content, a knowledge-based system and a VDP system One specific embodiment herein is a computer-implemented method that receives, into at least one computerized device, permissions and preferences from at least one user of at least one social networking site. The method automatically obtains user page data relating to the user from at least one social networking site (as limited by the permissions and preferences) using the computerized device.

One feature of embodiments herein is that they automatically monitor the social networking site to detect one or more pre-established events. These "events" are a set of logical rules that define time-based event occurrences (recurring events, such as a person's birthday, recurring seasonal events, monthly events, etc.) or the event rules can define one-time occurrences (one-time events, such as a job promotion, a marketing campaign, a social date, etc.). Each of the events comprises information about the topical content of the event. The monitoring process compares the user page data to predetermined event rules to determine whether the event has occurred. Again, this monitoring process is limited by the permissions and preferences set up by the user.

Upon detection of an event, the embodiments herein automatically identify a variable data campaign from a repository of variable data campaigns based on the topical content of the event. The variable data campaigns comprise variable information documents.

The embodiments herein automatically select text and media from the user page data that matches the topical content (again, using the computerized device). The user page data may also link to page data from users in the user's social network. Further, embodiments herein automatically generate a variable data print instance by combining the images and text from the user page data with the variable data campaign using the computerized device.

Then, the embodiments herein can automatically output the variable data print instance to a user of the social networking site using the computerized device. The outputting process can comprise displaying and/or printing the variable data print instance. This process can also provide the user an option to view the variable data print instance, using the computerized device, before outputting the variable data print instance. These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

The vast majority of popular social networking sites offer open APIs (Application Programming Interfaces) that support the development of add-on applications that enhance the online social networking experience. The embodiments herein utilize such add-on applications so that, when the embodiments herein are granted access, they can pull down profile information, photos, friend's information, and other application content from the user's site. More specifically, the embodiments herein provide a method for adding a variable data print (VDP) application to a user's social networking site. For example, the embodiments herein access and analyze the user's content and social network content to determine suitable VDP templates for customized and personalized print and cross-media products based on the data and graphics content available within the social networking site.

Variable data print applications are well-known to those ordinarily skilled in the art (for example, see U.S. Pat. No. 7,142,326, the complete disclosure of which is incorporated herein by reference) and a detailed discussion of such applications is not included herein, for sake of brevity. In a very simplified sense, variable data print applications maintain templates of documents that are customized with variable content. While variable data print applications are much more complex, for purposes of understanding their usage within the embodiments described herein, the variable data print applications provide a partially completed document, form, or template that is supplemented with text, photos, video, audio, graphics, etc., from one or more users' social networking sites.

The embodiments herein can make use of a hosted VDP service, such as XMPie, mentioned above, which contains a library of campaigns that can use extracted social networking site content as graphic assets and data sources for templates. The embodiments herein also employ a knowledge-based system to reason which templates are suitable for a user's content and profiles. The service can offer previews of templates that are instantiated for a particular user's content as well as offer delivery of purchased print products, portable document format (PDF) files, email-based content and other cross media. Such content includes the user's personal content and any accessible content in their social network.

Figure 1:
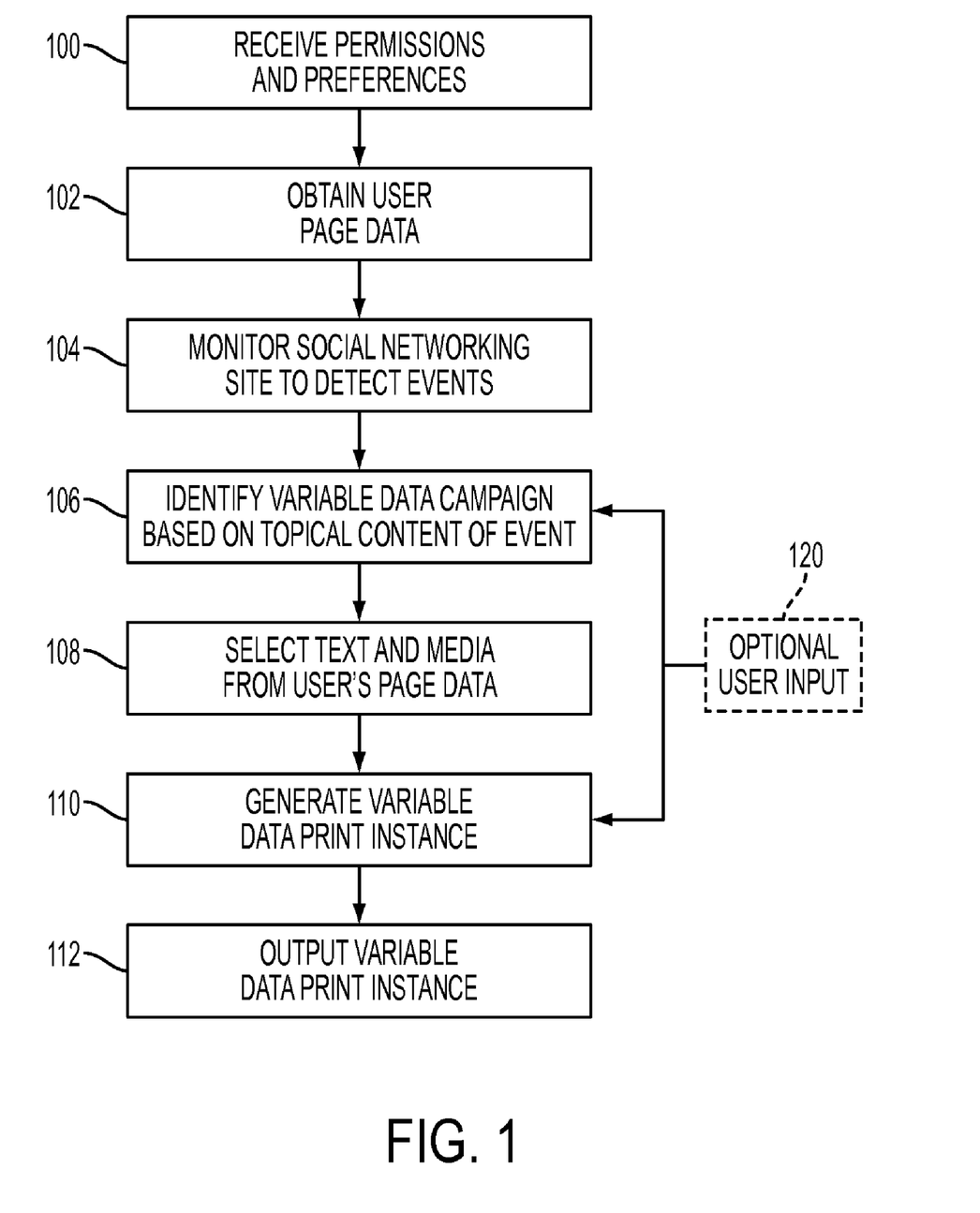
FIG. 1 is a flow diagram illustrating the operations of embodiments herein.

As shown in flowchart form in FIG. 1, one specific embodiment herein is a computer-implemented method that receives, into at least one computerized device (which can be a special purpose computerized device or a general purpose device), permissions and preferences from at least one user of at least one social networking site (100). The method automatically obtains user page data relating to the user from at least one social networking site (as limited by the permissions and preferences) using the computerized device in item 102.

Alternatively, the user may grant permission to a third party without a social networking presence (such as business or non-profit) to access their social networking content by enabling a direct connection (an example of which is via Facebook Connect).

One feature of embodiments herein is that they automatically monitor the social networking site using the computerized device to detect one or more pre-established events, as shown in item 104. These "events" are a set of logical rules that define time-based event occurrences (recurring events, such as a person's birthday, recurring seasonal events, monthly events, etc.) or the event rules can define one-time occurrences (one-time events, such as a job promotion, a marketing campaign, a social date, etc.).

For example, one of the events can comprise a user's friend's birthday. The rules for this event would be to begin the automated processing described herein a sufficient time before the date of the friend's birthday. Thus, in one example, one week before the friend's birthday each year, the automated processing described below could analyze the user's social networking site content and the friend's social networking site content and extract text and photos relating to the friend and/or the user and automatically create a customized birthday card for the user to give to his or her friend.

In addition, many other different types of recurring events can be utilized by the embodiments herein to automatically create weekly print instances (customized documents), monthly print instances, annual print instances, etc. For example, each 4th of July the embodiments herein can analyze the user's social networking site to create a customized 4th of July holiday poster based on the user's social networking site content. Similarly, marketing campaigns for third party entities (such as businesses and non-profits) can be customized for each user or group of users of social networking sites and can be related to specific holidays such as Halloween, Thanksgiving, Christmas, etc.

Further, if the user or the sponsoring vendor has a specific single occurrence event (such as a wedding, baby shower, job promotion, vacation, etc.) described anywhere within their social networking site, the event rules can identify this single occurrence as an "event" and prepare a customized document relating to the event based on the content within the user's social networking site.

Similarly, vendors can utilize events to trigger special marketing promotions. These events can include price reductions, certain weather conditions, certain financial conditions, as "events" to initiate the process of automatically preparing customized marketing material. The customized marketing material can be directed to users in a social networking site, and can include content from said users' social networking site or other associated social networking sites. For example, if a first user purchases a product and favorably describes that product on their social networking site, the vendor of that product can define such a condition as an "event" that causes customized marketing material to be created and distributed (using the methodology as described herein) to some or all of the friends listed in the user's social networking site. The customized marketing material could include statements from the user regarding the features and benefits of the product.

With embodiments herein, a number of predetermined events are included by default, yet the user, vendor, etc., can add to or customize any events as they see necessary. Further, the rules that define the events (and the topics associated with the events) can similarly be added to or altered by the user or the vendor to allow the embodiments herein to fully serve the purposes intended.

The monitoring process in item 104 compares the user page data to the predetermined event rules to determine whether the event has occurred. The events herein can occur before or after the dates and times of postings within a user's social networking site. Thus, for example, the "event" for birthday would occur one week before the birthday date. To the contrary, the "event" for an achievement (such as a victory in a sports competition) can occur one day after the sports competition has been completed. As would be understood by one ordinarily skilled in the art, the rules for the occurrence of an event are very flexible and are not limited to the few examples described here.

This monitoring process is limited by the permissions and preferences set up by the user in item 100. Thus, for example, user preferences may limit the type of holiday or type of personal event upon which the automated processes described herein can be based. Further, the preferences can determine how far in advance, or far after an occurrence the processing herein is performed. Also, vendors can similarly setup preferences to best deliver the various marketing materials to the targeted users.

Each of the events or sets of rules comprises information about the topical content of the event. In other words, rules relating to weddings, baby showers, holidays, job promotions, financial conditions, etc., each has one more topical areas that the event is based on. This topical content is maintained within the various predetermined rules to allow the embodiments herein to automatically identify a variable data campaign from a repository of variable data campaigns based the topical content of the event (item 106).

The variable data campaigns comprise one or more variable information documents. Thus, for example, if the event is a wedding (that is to occur in the future or that occurred in the past) the variable data campaign that is identified is from within the repository relates to weddings. One of the variable information documents within the identified campaign may be more appropriate for a wedding that is yet to occur, while another variable information documents may be more appropriate for a wedding that was just attended by the user or that just occurred, and the appropriate one is automatically selected based on date.

The embodiments herein can automatically select a single variable information document without user intervention. Alternatively, embodiments herein can select a variable data campaign that contains many variable information documents and allow the user to choose which variable information document the user prefers. Such optional user input is illustrated in FIG. 1 as item 120. In other alternatives, the embodiments herein can prepare a number of variable data print instances based on multiple variable information documents so that the user is eventually presented with a number of customized choices of print instances from which they may select (as described below).

Once the variable data campaign and variable information documents are identified, the embodiments herein automatically select topically matching text and media from related pages of the social networking site that matches the topical content (again, using the computerized device) in item 108. Thus, the embodiments herein can retrieve page data (text, pictures, video, audio, artwork, designs, etc.) from the user's social networking site pages or from pages maintained by other users that match the topic of the event.

In item 110, the embodiments herein automatically generate a variable data print instance (the customized document) by combining the images and text from the user page data with the variable data campaign using the computerized device. As mentioned above, this process can be fully automated or optional user input 120 can be utilized to allow the user to select between multiple variable data print instances that could be created from multiple variable information documents.

Continuing with the birthday card example described above, the process can be fully automated up to the point where embodiments herein find different birthday cards for the user's friend, each of which is based upon a different variable information document. Each of the different birthday cards would have substantially the same content that was drawn from the pages of the user's social networking site, however the layout and format of each of the birthday cards could be different (because they are different print instances). Then, for example, the user could simply choose between the different birthday cards or, if the birthday cards were offered for sale by a vendor, the user could choose and authorize payment.

Then, the embodiments herein can automatically output the variable data print instance to a user of the social networking site using the computerized device as shown in item 112. The outputting process 112 can comprise displaying and/or printing the variable data print instance. Thus, the embodiments herein can display the variable data print instance to the user to allow the user to accept or reject the variable data print instance before outputting the variable data print instance. In item 112, the user can also be provided the choice of whether the variable data print instance should be printed, automatically mailed, and or whether the variable data print instance should be output electronically (via e-mail, web posting, etc.).

Thus, the embodiments herein provide a knowledge-based automated methodology and system that can select one or more variable information documents from the campaign or repository based upon the number of factors. For example, the embodiments herein consider the topic (e.g. weddings); however there may be a large number of variable information documents that deal with weddings. Therefore, the knowledge-based automated methodology herein continues to refine the variable information documents to a small number depending upon whether most of the information drawn from the user's social networking site is pictorial in nature, textural in nature, relates to large amounts of audio, etc.

The knowledge-based automated methodology eliminates many variable information documents that do not match the type or nature of the topically matching content that will be drawn from the user's social networking site. Therefore, the embodiments herein are not topic-based only, but also match the variable information documents based upon the type (or nature) of data that will be retrieved from the user's social networking site. Similarly, the selection of the variable information documents can be further refined by determining whether the event will occur in the future or has occurred in the past.

By automating this knowledge-based methodology, the user is presented with one or more variable information documents completed as one or more variable data print instances that not only utilize event data that is directly relevant and of current interest to the user, but also selects the variable information document template that presents such event topic information in a manner most suited to the type of data (graphic, pictorial, video, audio, textural, etc.) that is used to populate the variable information documents template.

Figure 2:
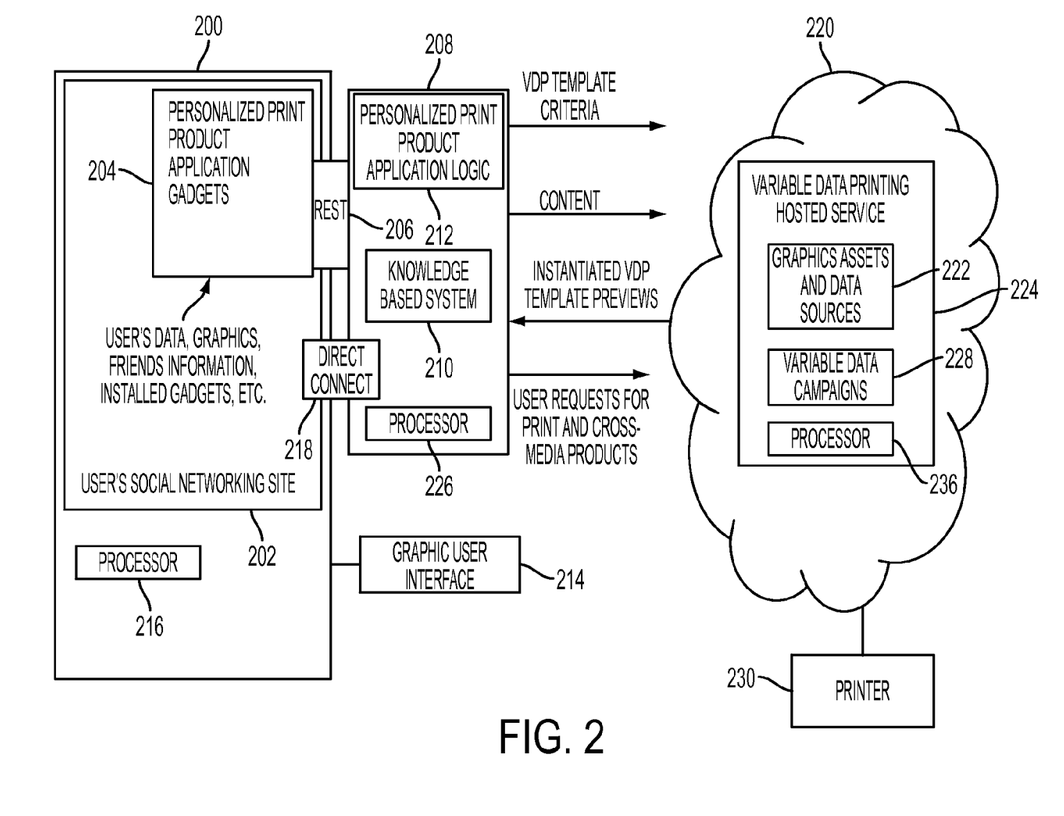
FIG. 2 is a schematic diagram illustrating the inter-relationship between elements utilized with embodiments herein.

FIG. 2 illustrates the elements utilized herein to achieve the processing shown in FIG. 1. More specifically, item 200 represents the user's computerized device with web browser to connect to his social networking site. Items 202 and 204 represent the social networking site to which the user remotely connects and manipulates via instructions that are executable by a processor 216. One set of instructions create the user view of the user's social networking site 202. Item 204 represents the instructions that form the personalized print product application gadget according to embodiments herein that is executed by the processor 216. The personalized print product application gadgets 204 include the user's data, graphics, friend's information, installed gadgets to manage the personalized print products, etc.

Item 212 also represents computer-readable storage media maintaining instructions that are executed by a processor 226 to perform the personalized print product application logic according to embodiments herein. Similarly, the computer-readable storage medium maintaining the instructions for the knowledge-based system according to embodiments herein that are executed by the processor 226 is shown as item 210. While the personalized print product application logic 212 and knowledge-based system 210 are shown as operating on a separate computerized device 208 in FIG. 2, as would be understood by those ordinarily skilled in the art, these applications could be operating upon the user's computerized device 200. Therefore, item 208 can represent a separate device or can represent a portion of the user's device 200, and either device can be a special purpose computerized device or can be a general purpose computer.

A Representational State Transfer interface (REST) 206 is shown as forming a connection between the personalized print product application gadgets and the personalized print product application logic. Alternatively, the application logic may use a social networking sites direct connect capability 218 (an example of which is Facebook Connect) which both authorizes the application for the user's social site and provides the capability to pull data into the print product application 208. Computerized device 208 (and/or computerized device 200) communicates with various external computerized devices networks, cloud environments etc., represented by item 220. These elements exchange items such as the variable data print template criteria, content, instantiated variable data print template previews, user requests for print and cross-media products, etc. The cloud environment 220 includes a computer-readable storage medium that maintains instructions forming a variable data printing hosted service 224 which, in turn, includes graphic assets and data sources 222 and variable data campaigns 228. The processor for executing such instructions is shown as item 236. Item 230 represents a printer or printing service which can be connected to any of the elements, directly or indirectly (operatively connected).

Therefore, personalized print product embodiments are added to a user's social networking site and are granted access to the user's content and their friends' content. The application uses the REST interface 206 or a Direct Connect 218 capability to support server-side 208 processing that drives the gadgets in the social networking container.

The server-side processing 208 includes a knowledge-based system that processes user content to determine candidate campaigns. As described above, templates from the campaign 228 are instantiated with content from the user's sites and a friend's site and then displayed to the user. For example, as previously illustrated, the personalized print product application according to embodiments herein may have a birthday card feature that suggests a customized and personalized pop-up birthday card for a user's friend where the friend's name is taken from the user's friends list; the friend's birthday is taken from the friend's profile; image content is taken from the user's Friends section that contains portraits; recent wall-to-wall (public) posting between the two friends may be incorporated into the card; etc.

Thus, FIG. 2 illustrates a first computerized device 200 maintaining computerized instructions 204 for automatically obtaining user page data from at least one social networking site 202. The instructions cause the first computerized device 200 to automatically monitor the social networking site 202 to detect an event. A second computerized device 208 maintains computerized instructions for automatically identifying a variable information document from a repository 228, upon detection of an event, based the topical content of the event. The instructions 210 and 212 cause the computerized device 208 to automatically select topically matching data from the user page data that matches the topical content of the event; and automatically send content and template criteria to a hosted or cloud-based service 224 (such as a hosted XMPie uProduce server) which retrieves a template from 228 and generates a variable data print instance by combining the images and text from the user page data with the variable information document.

The printing device 230 can be operatively connected to the hosted service 224 such that the printing device 230 outputs the variable data print instance to a user of the social networking site. The user may select the printing device 230 which produces the variable data print instance that is most convenient for output retrieval. Alternatively, the output may be produced remotely in which it is subsequently mailed to the user. Alternatively, the hosted service 224 may produce electronic output which is electronically sent to the user for producing output on print device 230 connected to first computerized device 200. A graphic user interface 214 can display the variable data print instance and provide the user an option to view the variable data print instance.

Figure 3:
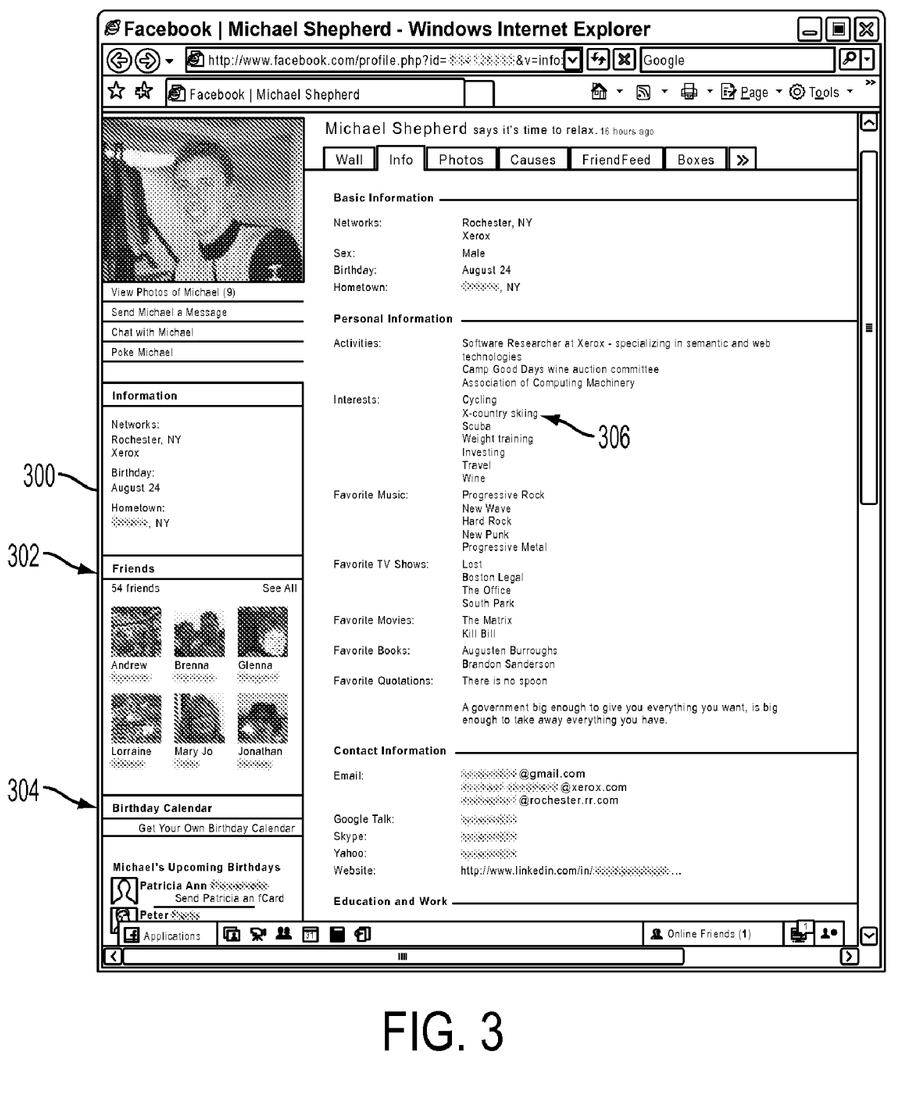
FIG. 3 is a schematic diagram of a screen shot according to embodiments herein.

The embodiments herein have an underlying knowledge-based system and ontology 210 that supports inferences about the content on a user's social networking site. For example, item 300 in FIG. 3 is a schematic drawing of the user page illustrating a user's social networking site that has information about an individual's friends (e.g., in the "Friends" gadget as shown in item 302 in FIG. 3); birthdays (e.g., in the "Basic Information" list in a user profile as shown in item 304 in FIG. 3); interests (e.g., in the "Personal Information/Interests" list in a user profile as shown in item 306 in FIG. 3) etc.

Figure 4:
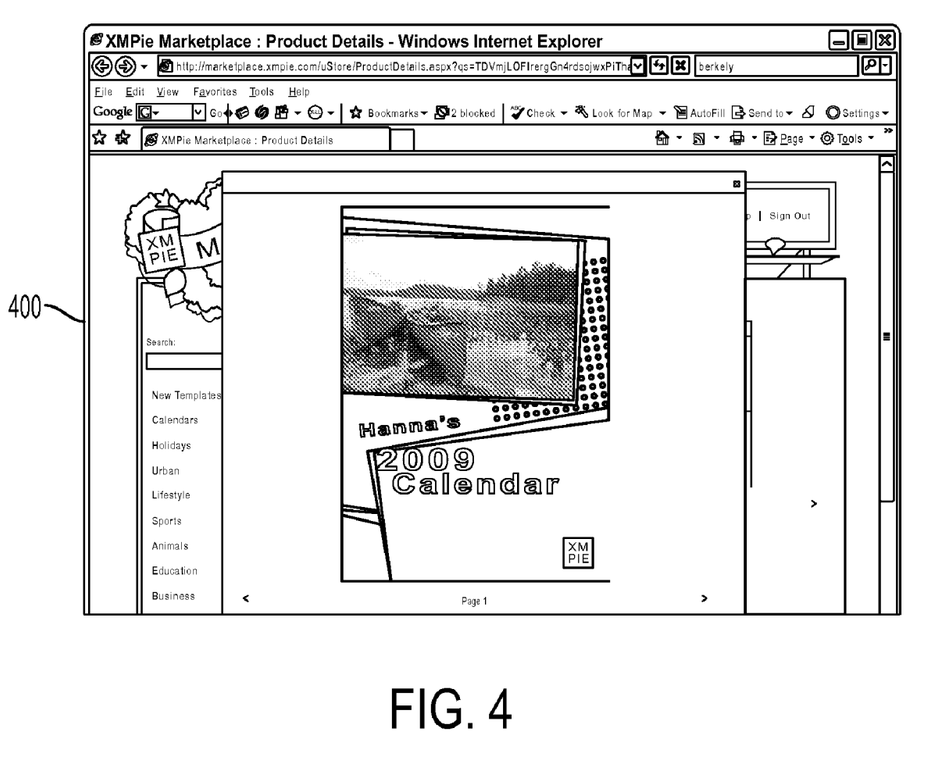
FIG. 4 is a schematic diagram of a screen shot according to embodiments herein.
Figure 5:
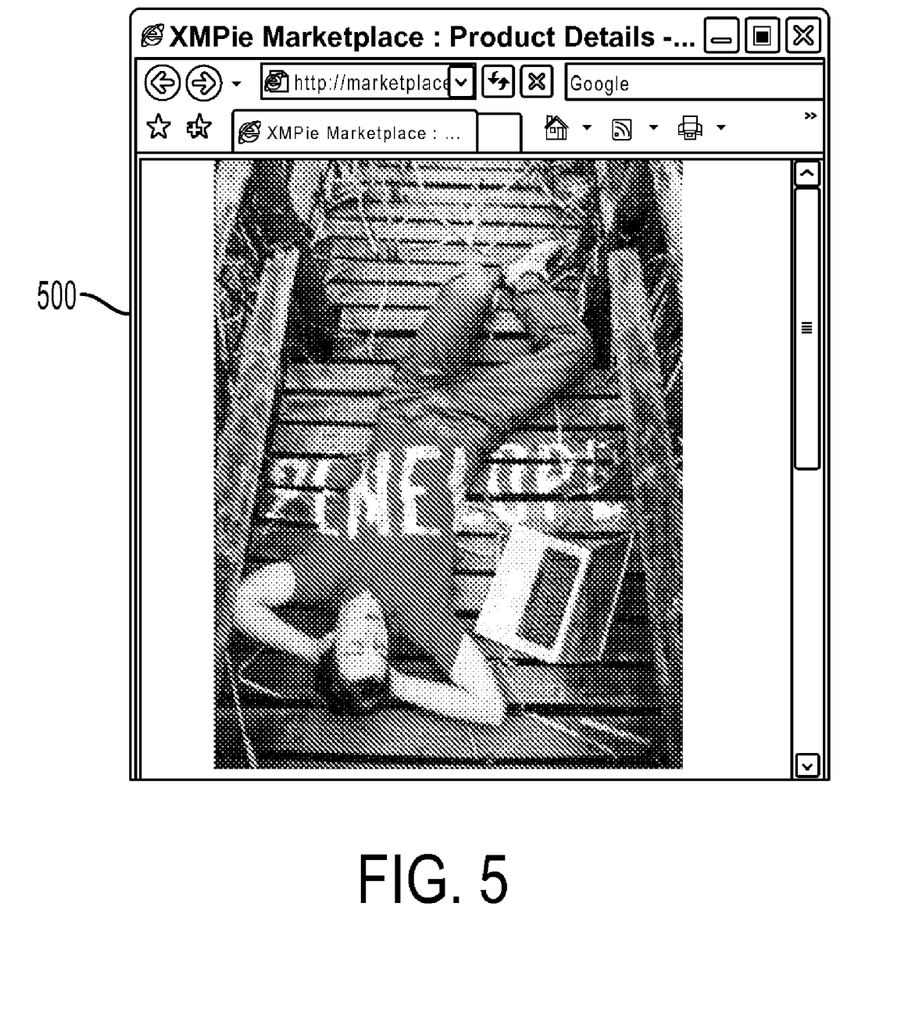
FIG. 5 is a schematic diagram of a screen shot according to embodiments herein.

Once the embodiments herein have been granted access to the above information for a user's friends as well as the individual user themselves, the VDP application can offer a personalized calendar with a friend's name and a theme that is compatible with the friend's interests, such as the outdoors theme calendar 400 shown in FIG. 4. Note that in this example, knowledge-based reasoning according to embodiments herein is used to determine that interests are related to themes and that cross-country skiing and scuba are related to the specific outdoor theme. An example of integrating a friend's name directly in an outdoor image, e.g. via XMPie's ulmage product, is shown as item 500 in FIG. 5.

Additionally, the knowledge-based system according to embodiments herein can be used to parse and analyze a user's activity stream consisting of status updates, posted/shared links which they like, wall-to-wall (public) conversations, groups or causes they have joined, and people or events of which they have become a fan. Through analysis of the user's activity stream content, the embodiments herein suggest appropriate VDP templates that correspond to that content.

Figure 6:
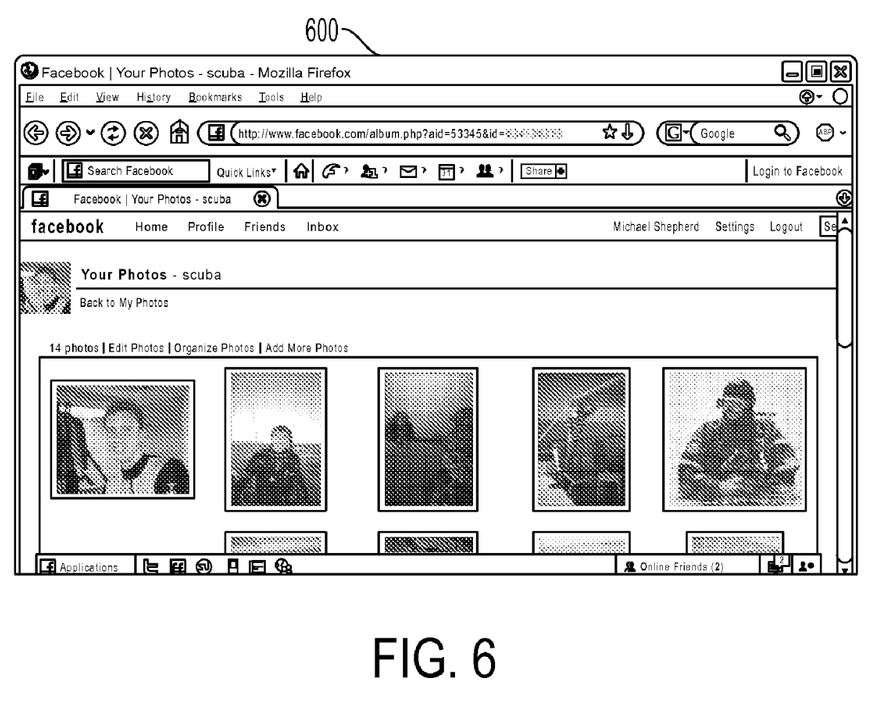
FIG. 6 is a schematic diagram of a screen shot according to embodiments herein.

Images used in the print/cross-media product can come from a template library, but can also come from the user's photo gallery and named photo albums as shown in FIG. 6, or from a friend's photos. For example, if a friend with an upcoming birthday has scuba diving listed as an interest in their Personal Information section the embodiments herein may suggest a personalized birthday greeting card created using an image from the sender's photo album labeled "scuba" (as shown in FIG. 6) rather than using a scuba diving image from the hosted template library.

Figure 7:
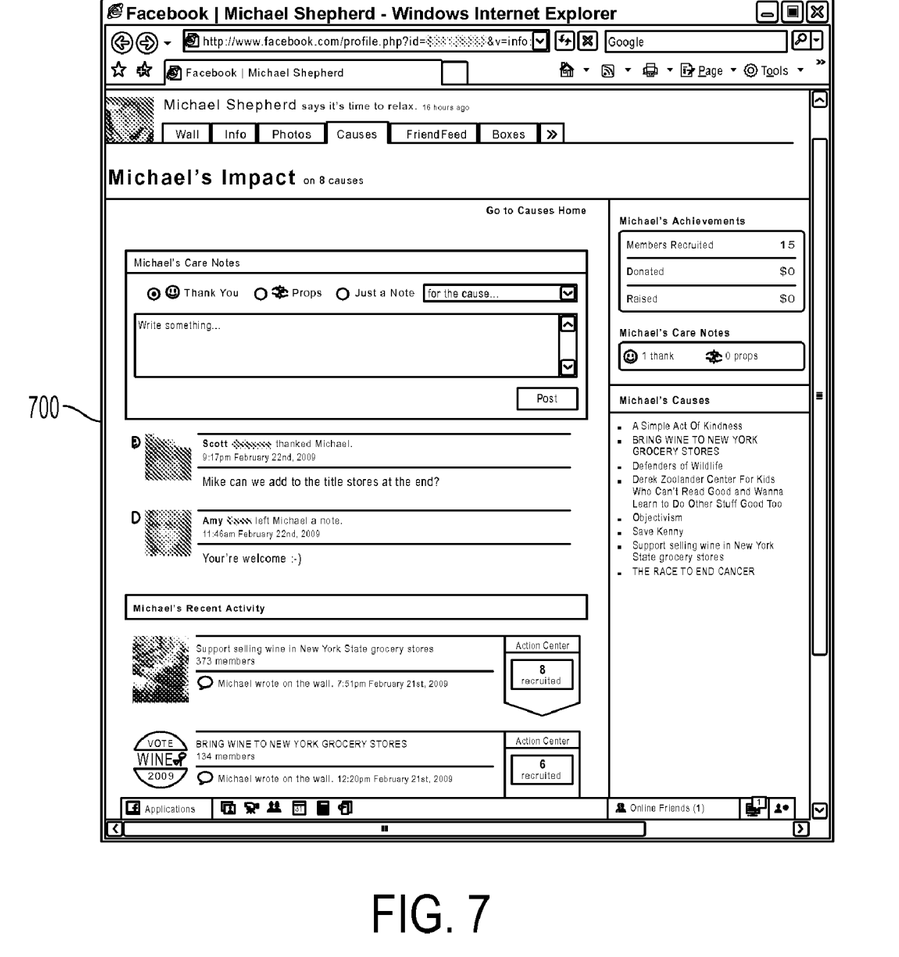
FIG. 7 is a schematic diagram of a screen shot according to embodiments herein.
Figure 8:
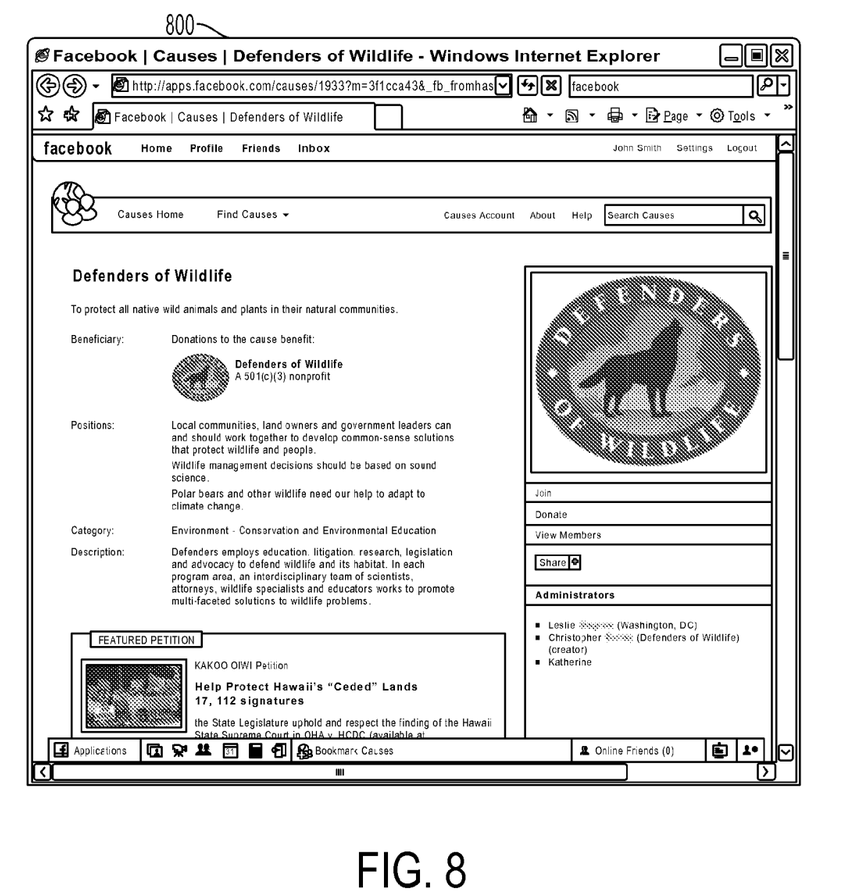
FIG. 8 is a schematic diagram of a screen shot according to embodiments herein.

The embodiments herein can also be used for a promotional use. For example, in FIG. 7, a "Causes" application 700 is added to a user's social networking site. If a social networking site were to incorporate such an application as a gadget accessible via their API, then the information shown in FIG. 7, such as the members of the cause, would be available to the embodiments herein. In this example, the online cause/group shown in FIG. 7 may want to send personalized promotional material to all of its members or a certain group or network of people. The material could incorporate custom content for PURLs, e-mails, and hard copy. For instance, the Defenders of Wildlife cause could solicit all the members of the Stop Global Warming cause as shown in FIG. 8 as item 800. Response URLs could be used that point the target of the promotion back to the cause site.

There are various approaches to implementing the knowledge-based reasoning portion of the embodiments herein including using rule-based systems and/or ontologies. The types of knowledge to be encoded include information about specific users and their activities, gadgets installed on user sites, and other types of labeled or tagged graphics and textual content. Such a knowledge-based application can be periodically updated as new social networking gadgets are developed and supported by the social networking site API, which in turn result in new content being added to users' sites.

Note that as technology advancements are made, the embodiments herein can obtain content from social networking application add-ons and not just from gadgets supported by the site's API. For example, the embodiments herein may use two backend servers (serving as social networking applications) to separately communicate or advertise their services to one another. Communication would not be done through the social networking site, but the knowledge transferred between both server-side applications would be accessible by the site.

Therefore, as described above, the embodiments herein utilize such add-on applications so that, when the embodiments herein are granted access, they can pull down profile information, photos, friend's information, and other application content from the user's site. More specifically, the embodiments herein provide a method for adding a variable data print (VDP) application to a user's social networking site.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The word "printer" or "printing device" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. A computer-implemented method comprising:
   automatically obtaining user page data from at least one social networking site, using at least one computerized device;
   automatically monitoring said social networking site using said computerized device to detect an event;
   upon detection of said event, automatically identifying a variable information document from a repository based on the topical content and timing of said event using said computerized device;
   automatically selecting data from said user page data that matches said topical content and said timing of said event using said computerized device;
   automatically generating a variable data print instance by combining said data from said user page data with said variable information document using said computerized device; and
   automatically outputting said variable data print instance to a user of said social networking site using said computerized device.

2. The method according to claim 1, said outputting comprising providing said user an option to view said variable data print instance, using said computerized device.

3. The method according to claim 1, said outputting comprising one of displaying and printing said variable data print instance.

4. The method according to claim 1, said monitoring comprising comparing said user page data to predetermined event rules to determine whether said event has occurred.

5. The method according to claim 1, said event comprising one of a recurring event and a one-time event.

6. A computer-implemented method comprising:
   automatically obtaining user page data relating to at least one user from at least one social networking site, using at least one computerized device;
   automatically monitoring said social networking site to detect an event of a plurality of pre-established events using said computerized device, each of said events comprising topical content;
   upon detection of said event, automatically identifying a variable data campaign from a repository of variable data campaigns based on said topical content and timing of said event, said variable data campaigns comprising variable information documents;
   automatically selecting text and media from said user page data that matches said topical content and said timing of said event using said computerized device;
   automatically generating a variable data print instance by combining said text and media from said user page data with said variable data campaign using said computerized device; and
   automatically outputting said variable data print instance to a first user of said at least one user of said social networking site using said computerized device.

7. The method according to claim 6, said outputting comprising providing said first user an option to view said variable data print instance, using said computerized device.

8. The method according to claim 6, said outputting comprising one of displaying and printing said variable data print instance.

9. The method according to claim 6, said monitoring comprising comparing said user page data to predetermined event rules to determine whether said event has occurred.

10. The method according to claim 6, said event comprising one of a recurring event and a one-time event.

11. A computer-implemented method comprising:
    receiving, into at least one computerized device, permissions and preferences from at least one user of at least one social networking site;
    automatically obtaining user page data relating to said user from at least one social networking site as limited by said permissions and preferences, using said computerized device;
    automatically monitoring said social networking site to detect one of a plurality of pre-established events using said computerized device, each of said events comprising topical content, and said monitoring being limited by said permissions and preferences;

upon detection of said events, automatically identifying a variable data campaign from a repository of variable data campaigns based on said topical content and timing of said events, said variable data campaigns comprising variable information documents;

automatically selecting text and media from said user page data that matches said topical content and said timing of said events using said computerized device;

automatically generating a variable data print instance by combining said text and media from said user page data with said variable data campaign using said computerized device; and automatically outputting said variable data print instance to a user of said social networking site using said computerized device.

12. The method according to claim 11, said outputting comprising providing said first user an option to view said variable data print instance, using said computerized device.

13. The method according to claim 11, said outputting comprising one of displaying and printing said variable data print instance.

14. The method according to claim 11, said monitoring comprising comparing said user page data to predetermined event rules to determine whether said event has occurred.

15. The method according to claim 11, said event comprising one of a recurring event and a one-time event.

16. A computerized system comprising:
  a first computerized device maintaining computerized instructions for automatically obtaining user page data from at least one social networking site, said instructions causing said first computerized device to automatically monitor said social networking site to detect an event;
  a second computerized device maintaining computerized instructions for automatically identifying a variable information document from a repository, upon detection of said event, based on topical content and timing of said event, said instructions causing said second computerized device to automatically select data from said user page data that matches said topical content and said timing of said event; and
  a variable data printing hosted service automatically generating a variable data print instance by combining said data from said user page data with said variable information document; and
  a printing device operatively connected to one of said first computerized device and said second computerized device and said hosted service, said printing device outputting said variable data print instance to a user of said social networking site.

17. The computerized system according to claim 16, further comprising a graphic user interface displaying said variable data print instance and providing said user an option to view said variable data print instance.

18. The computerized system according to claim 16, said first computerized device comparing said user page data to predetermined event rules to determine whether said event has occurred.

19. The computerized system according to claim 16, said event comprising one of a recurring event and a one-time event.

20. A computer-readable storage medium tangibly embodying instructions executable by a computer to perform a method comprising:
  automatically obtaining user page data from at least one social networking site, using at least one computerized device;
  automatically monitoring said social networking site using said computerized device to detect an event;
  upon detection of said event, automatically identifying a variable information document from a repository based on topical content and timing of said event using said computerized device;
  automatically selecting data from said user page data that matches said topical content and said timing of said event using said computerized device;
  automatically generating a variable data print instance by combining said data from said user page data with said variable information document using said computerized device; and
  automatically outputting said variable data print instance to a user of said social networking site using said computerized device.

* * * * *